April 5, 1960 S. ALLEN 2,931,174
VAPORIZER FOR LIQUID FUEL
Filed Nov. 30, 1953 3 Sheets-Sheet 1

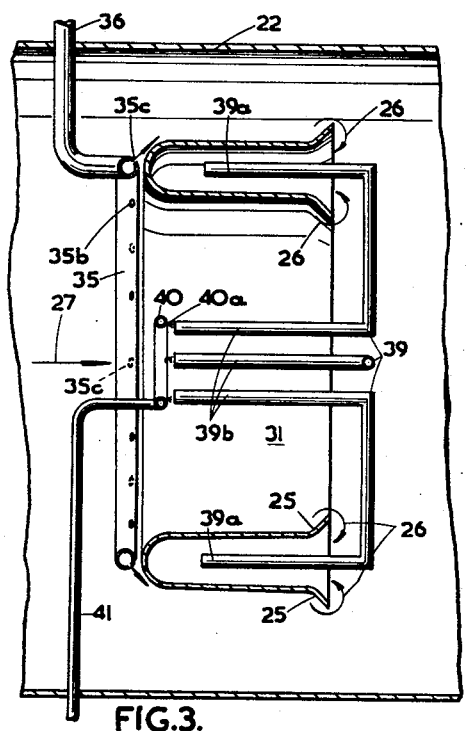
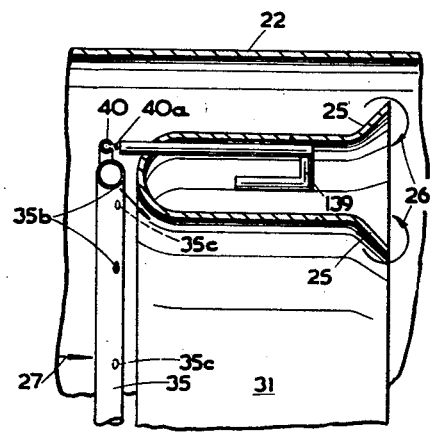

April 5, 1960

S. ALLEN 2,931,174

VAPORIZER FOR LIQUID FUEL

Filed Nov. 30, 1953

United States Patent Office 2,931,174
Patented Apr. 5, 1960

2,931,174

VAPORIZER FOR LIQUID FUEL

Sidney Allen, Coventry, England, assignor to Armstrong Siddeley Motors Limited, Coventry, England Application November 30, 1953, Serial No. 395,229

Claims priority, application Great Britain December 20, 1952

3 Claims. (Cl. 60—39.71)

The invention relates to a vaporizer and burner, working with a liquid fuel and a pressurized gaseous oxidizer, for use, for example, in a main, or a reheating, combustion chamber of a gas-turbine power plant, or a combustion chamber of a ram jet power plant. The object of the invention is an improved vaporizer and burner for any of these several purposes.

According to the invention, the vaporizer and burner includes a casing, arranged with radial clearance within a duct (forming the combustion chamber) through which a main flow of the gaseous oxidizer passes, which is closed at its upstream end and open at its downstream end, and means for delivering liquid fuel on to the exterior of the casing remotely from the downstream end whereby to be swept along the external surface of the casing by the main flow through the duct, the open, downstream end of the casing, under the influence of the said main flow passing beyond it, causing the pressure within the casing to be depressed and to induce a charge of the fuel, in vaporized condition, and oxidizer for combustion within the casing, the charge, in burning, providing heat for vaporizing the liquid fuel on the exterior of the casing, and also providing a stable flame zone from which the remainder of the vaporized fuel and oxidizer (i.e., downstream of the casing) are kept burning.

The casing can be can-like, or it can be an annular one which is arranged coaxially within the duct and has its upstream end so formed that the liquid fuel delivered onto it is swept by the main flow along both its radially-inner and outer external surfaces.

The direction of delivery of the fuel onto the said upstream end may be such as to assist in obtaining this distribution over the said surfaces. Thus, the fuel may be delivered in the form of divergent jets onto the upstream end of the casing.

According to a further feature, the casing has open-ended pockets, on its outer surfaces at the upstream end, into which the fuel is directed.

The open, downstream end of the casing can be flared whereby to enhance the induction of the charge.

According to a still further feature, some of the oxidizer is additionally fed to the interior of the casing by a pipe which extends into the casing, the portion of the pipe which is within the casing having an outlet end presented towards the closed, upstream end of the casing, and the portion of the pipe which is outside the casing having an inlet end directed to collect the oxidizer from the main flow.

Additionally, it could be arranged for a portion of the liquid fuel to be supplied to the inlet end of the pipe, in which event its outlet end can be adjacent the upstream end of the casing as there will be less need to enhance the induction of the said charge of the combustion components into the downstream end of the casing.

In the drawings, in which the invention is described with reference to its application to a gas-turbine power plant:

Figures 3 and 4 are views similar to Figure 2 but additionally showing two different arrangements of J-like pipes;

Figure 1:
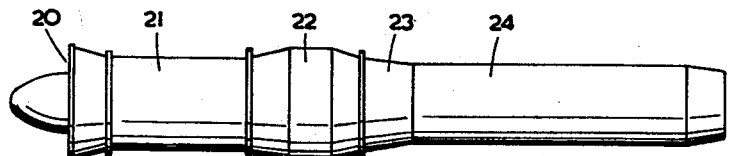
Figure 1 is a general view, in side elevation, of the power plant.

The plant shown in Figure 1 includes an air intake 20, an axial-flow compressor in the zone of 21, combustion chamber means in the zone of 22, an axial-flow turbine in the zone of 23, and a jet pipe, which may be provided with exhaust re-heating means, at 24.

Figure 2:
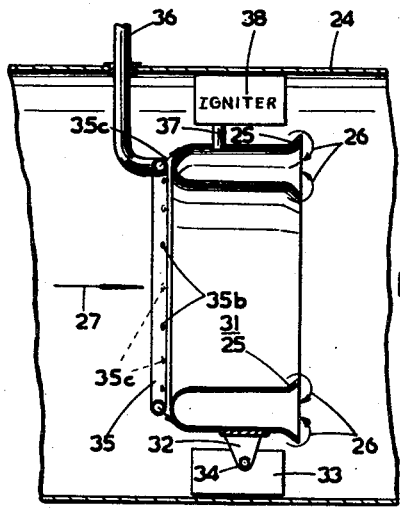
Figure 2 is a diagrammatic section, to a larger scale, of one form of annular vaporizer and burner; but without J-like pipes, provided by the invention.
Figure 6:
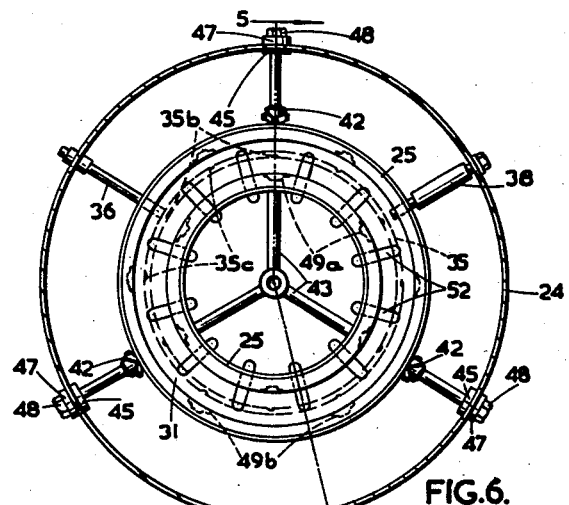
Figures 5 and 6 are, respectively, longitudinal and transverse sections illustrating another form of annular vaporizer and burner, Figure 5 being on the line 5—5 of Figure 6.
Figure 5:
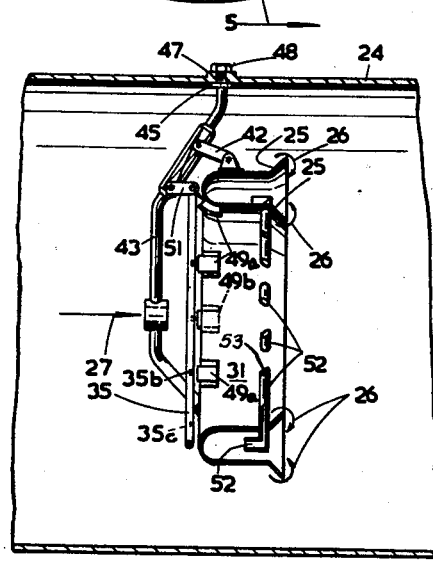

The constructions shown in Figures 2, 5 and 6 are primarily intended to be within the jet pipe 24 for exhaust re-heating purposes, and those shown in Figures 3, 4, 7 and 8 are primarily intended to be within the zone 22 for use with the main combustion system.

In all the constructions shown, the vaporizers and burners of the invention, whether of the annular or the can type, incorporate the feature of having the downstream ends of their casings flared, as indicated at 25, for enhancing the induction into them, as indicated by the curved arrows 26, of a portion of the main oxidizer flow whose direction is indicated by the arrows 27.

Referring to Figure 2 the annular vaporizer and burner casing 31 shown is supported at three points, spaced 120° apart, from the jet pipe 24 by pairs of brackets 32 (only one of which is shown) fast with the casing and straddling a mounting block 33 fast with the jet pipe, the brackets being held to the mounting blocks by bolts 34.

The upstream end of the casing is convexly rounded and is arranged downstream of an annular fuel manifold 35 which receives a main fuel supply through a pipe 36 extending to the outside of the jet pipe. The fuel, emitted from rings of holes 35b, 35c, with divergent axes, at the downstream side of the manifold 35, is directed onto the said convex end to be swept along the radially-inner and outer walls of the casing by the flow of oxidizer. The mixture of fuel and oxidizer induced into the downstream end of the casing is ignited, through a tube 37, by a pilot flame generated in an igniter which forms no part of the present invention but is indicated generally at 38. When combustion within the casing is established, the heat generated vaporizes the fuel flowing over its exterior for supplying the interior of the casing and for combustion in a main flame zone downstream of the casing.

In Figure 3 the flow induced into the downstream end of the casing is supplemented by a plurality of J-like pipes 39, 39 which are arranged in a circle and have their one limbs 39a extending into the downstream end of the casing. The other limbs 39b, outside the casing, extend in the upstream direction to receive a through-flow of the oxidizer, and there is an additional fuel manifold 40, supplied by a pipe 41 which extends to the outside of the jet pipe, for delivering jets 40a of fuel into the limbs 39b. The limbs 39a preferably extend to near the upstream ends of the interior of the casing so as to provide a combustible mixture to that region, and the combustion within the casing additionally heats the limbs 39a for vaporizing the fuel therein.

In Figure 4 the J-like pipes 139 (only one of which is shown) extend into the upstream end of the casing whereby substantially the whole of their lengths is subjected to the temperature within the casing for vaporizing the fuel supply to the interior of the J-like pipes.

In Figures 5 and 6 the annular vaporizer and burner casing is shown suspended by three bifurcated links 42 from a three-armed spider 43, the outer ends of the spider arms having enlarged heads 45 with screw-threaded extensions which pass through bosses 47 on the exterior of the jet pipe and are secured by nuts 48. The fuel manifold 35 is likewise supported by three links 51 (of which only one is shown in Figure 5) from the spider, the links 42 and 51 respectively supporting the casing and fuel manifold in a manner to compensate for expansion due to temperature changes.

The fuel manifold has the two series of holes 35b, 35c, respectively directed to spray the fuel into open-ended pockets 49a and 49b on the radially-inner, and outer, external surfaces of the casing at the upstream end. In this way the fuel is constrained to flow along the surface of the casing.

Additionally, the vaporizer has a plurality of L-shaped pipes 52 for delivering oxidizer from the jet pipe to within the casing, the one limbs of these pipes extending radially through the radially-inner wall of the casing to beyond the zone of vapor surrounding the latter and having their open ends 53 formed obliquely to bias a flow of the oxidizer, only, into them.

Figure 7:
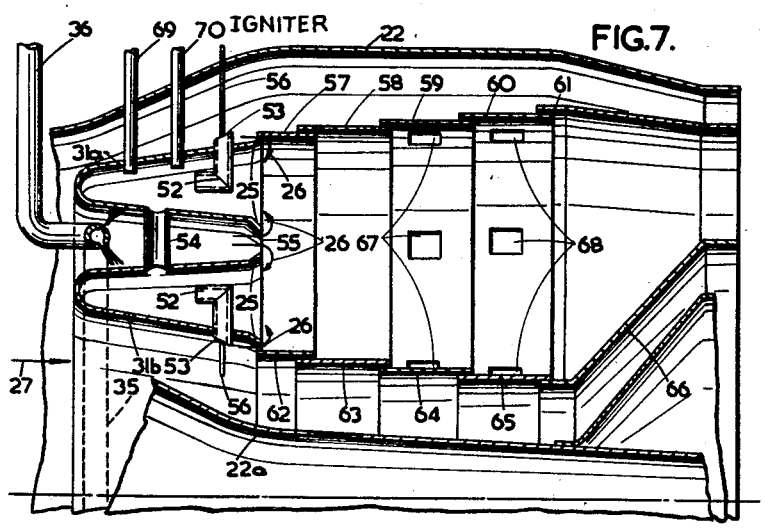
Figure 7 is a longitudinal section illustrating yet another form of annular vaporizer and burner.

In Figure 7 is shown a pair of concentrically-arranged annular vaporizer and burner casings 31a, 31b which intercommunicate through at least one radial interconnecting tube 54. In this case the fuel manifold 35 is arranged to be between the closed upstream ends of the two casings so as to deliver the fuel to flow over the adjacent surfaces only of the latter, and there is an annular clearance 55, between the downstream ends of the casings, through which the vaporized fuel and oxidizer pass for partial induction into both casings. Through the remote walls of the two casings extend circular series of L-shaped pipes 52, and fuel supply pipes 56 deliver into their oxidizer inlet ends 53. The main annular flame chamber shown is defined between, on the one hand, overlapping outer annuli 57, 58, 59, 60 and 61 and, on the other hand, overlapping inner annuli 62, 63, 64, 65 and 66. The annuli 57 and 62 are spaced radially from the downstream ends of the vaporizers whereby to admit oxidizer, and further supplies of the latter can enter the combustion chamber through similar spacings between the other annuli and through apertures 67, 68 in certain of them. At 22a is shown a wall which, together with the wall 22, defines an annulus through which the oxidizer flows and in which the vaporizers are concentrically arranged.

For starting up purposes there is a means indicated at 69 for delivering a jet of fuel to the casing and an igniter 70.

Figure 8:
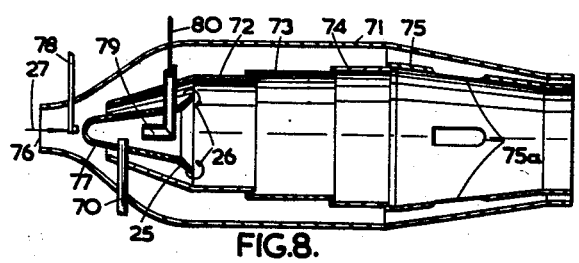
Figure 8 is a longitudinal section through one form of can type vaporizer and burner in accordance with the invention.

The can type combustion chamber shown in Figure 8 includes an outer tubular wall 71 within which is a flame tube comprising a series of overlapping annuli 72, 73, 74 and 75 arranged with radial spacing. The open upstream end of the annulus 72, and the radial spaces, admit air, delivered by the compressor into the upstream opening 76, from within the wall 71. As shown, the annulus 75 can be provided with holes 75a through which further supplies of air can enter, and the annular space extends, in the downstream direction, between the wall 71 and the annulus 75 for cooling the latter.

Within the annulus 72 and radially spaced therefrom, is a thimble-like vaporizer and burner casing 77 on to the convexly-curved, closed, upstream end of which fuel is delivered in divergent jets from a pipe 78. This fuel is caused, by the air entering the upstream end of the annulus 72, to pass along the exterior of the thimble and, as previously described with reference to the annular type of vaporizer, to be vaporized and for some of the mixture to enter the downstream end of the thimble 77 as indicated by the arrows 26. An L-shaped pipe 79 extends from the annular space, and through the annulus 72 and thimble 77, to the interior of the latter, and a pipe 80 delivers fuel to the interior of the pipe 79 for providing a combustible mixture within the thimble.

It will be seen that by the invention there is provided a vaporizer and burner providing a quiescent zone into which vaporized fuel and gaseous oxidizer are fed for burning, and over the external surface (which thus becomes heated) of which at least a portion of the liquid fuel is forced to flow for vaporization purposes.

What I claim as my invention and desire to secure by Letters Patent of the United States is:

1. A vaporiser and burner, working with a liquid fuel and a pressurised gaseous oxidiser and for use in a gas turbine power plant or a ram jet power plant, including an annular casing arranged with radial clearance within a duct through which a main flow of the gaseous oxidizer passes, said casing being closed at its upstream end and open at its downstream end, means forming pockets on the radially-inner and radially-outer external surfaces of said casing adjacent its upstream end, said pockets extending in the downstream direction and being open at each end, and a circular supply pipe coaxial with and closely adjacent said casing for causing liquid fuel, delivered in a generally downstream direction, to pass through said pockets and to impinge on the exterior of said casing remotely from its downstream end to be swept along its radially-inner and radially-outer external surface by said main flow, said external surfaces being heated, for vaporising said swept fuel, by combustion within said casing of a charge of oxidiser and fuel, which has been induced into said open downstream end of said casing and vaporised on said external surfaces, and said charge, in burning, providing a stable flame zone from which the remainder of the vaporised fuel and oxidiser passing beyond the downstream end of said casing is kept burning.

2. A vaporizer and burner, working with a liquid fuel and a pressurized gaseous oxidizer and for use in a gas-turbine power plant or a ram jet power plant, including at least one casing arranged with radial clearance within a duct through which a main flow of the gaseous oxidizer passes, said casing being closed at its upstream end and open at its downstream end, means closely adjacent said casing for causing said liquid fuel delivered in a generally downstream direction to impinge directly to the exterior of said casing remotely from its downstream end to be swept along an external surface of said casing by said main flow, said external surface being heated, for vaporizing said swept fuel, by combustion within said casing of a charge of oxdiser and fuel, which been induced into said open downstream end of said casing and vaporized on said external surface, and a pipe having an outlet end which is within said casing and directed towards the closed upstream end of the latter, said pipe having an inlet end which is outside said casing and arranged to collect oxidizer from the main flow for addition to said charge, said charge, in burning, providing a stable flame zone from which the remainder of the vaporized fuel and oxidizer passing beyond the downstream end of said casing is kept burning.

3. A vaporizer and burner, according to claim 2, additionally including means for supplying liquid fuel into the inlet end of the pipe.

References Cited in the file of this patent

UNITED STATES PATENTS

| | | |
|---|---|---|
| 2,657,532 | Reid et al. | Nov. 3, 1953 |
| 2,679,137 | Probert | May 25, 1954 |
| 2,720,078 | Day et al. | Oct. 11, 1955 |

FOREIGN PATENTS

| | | |
|---|---|---|
| 981,045 | France | Jan. 10, 1951 |